US010757724B2

United States Patent
Sahlin et al.

(10) Patent No.: US 10,757,724 B2
(45) Date of Patent: Aug. 25, 2020

(54) METHODS AND APPARATUS FOR SCHEDULING IN UPLINK

(71) Applicant: Telefonaktiebolaget LM Ericsson (publ), Stockholm (SE)

(72) Inventors: Henrik Sahlin, Mölnlycke (SE); Jingya Li, Göteborg (SE); Helka-Liina Määttanen, Helsinki (FI); Ying Sun, Sundbyberg (SE); Gustav Wikström, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 196 days.

(21) Appl. No.: 15/559,457

(22) PCT Filed: Oct. 31, 2016

(86) PCT No.: PCT/SE2016/051065
§ 371 (c)(1),
(2) Date: Sep. 19, 2017

(87) PCT Pub. No.: WO2017/078595
PCT Pub. Date: May 11, 2017

(65) Prior Publication Data
US 2018/0115984 A1 Apr. 26, 2018

Related U.S. Application Data

(60) Provisional application No. 62/250,183, filed on Nov. 3, 2015.

(51) Int. Cl.
*H04W 72/12* (2009.01)
*H04W 72/14* (2009.01)
(Continued)

(52) U.S. Cl.
CPC ....... *H04W 72/1268* (2013.01); *H04L 5/0048* (2013.01); *H04W 72/0413* (2013.01); *H04W 72/14* (2013.01)

(58) Field of Classification Search
CPC .................................................. H04W 72/1268
See application file for complete search history.

(56) References Cited

U.S. PATENT DOCUMENTS 10,050,818 B2 * 8/2018 Hwang ................. H04L 27/261
10,075,266 B2 * 9/2018 Luo ........................ H04L 1/0025
(Continued)

FOREIGN PATENT DOCUMENTS

WO    2014073856 A1    5/2014
WO    2016142006 A1    9/2016
(Continued)

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 12)", 3GPP TS 36.212 V12.6.0, Sep. 2015, 1-95.
(Continued)

*Primary Examiner* — Parth Patel
(74) *Attorney, Agent, or Firm* — Murphy, Bilak & Homiller, PLLC

(57) ABSTRACT

It is presented a method performed by a network node of a wireless communication network for scheduling a wireless device in uplink. An uplink signal structure is configured to be used by the wireless device and the network node, wherein the uplink signal structure defines transmission subframes divided into symbol periods. The network node applies a short Transmission Time Interval, sTTI, scheduling interval, wherein each sTTI is shorter in time than a subframe and each sTTI comprises at least one symbol period.
(Continued)

The method comprises: transmitting a control information message to the wireless device for an sTTI scheduling interval, the control information message comprising uplink scheduling information assigned to the wireless device, the uplink scheduling information indicating a position and a length for at least one of a reference signal and data in the uplink sTTI.

12 Claims, 5 Drawing Sheets

(51) Int. Cl.
*H04L 5/00* (2006.01)
*H04W 72/04* (2009.01)

(56) References Cited

U.S. PATENT DOCUMENTS

| | | | |
|---|---|---|---|
| 10,333,654 B2* | 6/2019 | Moon | H04L 1/1812 |
| 10,333,738 B2* | 6/2019 | Lee | H04L 25/0224 |
| 2010/0113004 A1* | 5/2010 | Cave | H04W 52/365 |
| | | | 455/422.1 |
| 2011/0305179 A1* | 12/2011 | Wang | H04L 1/0031 |
| | | | 370/311 |
| 2011/0310833 A1* | 12/2011 | Lee | H04L 1/1829 |
| | | | 370/329 |
| 2013/0083766 A1 | 4/2013 | Chung et al. | |
| 2013/0265955 A1* | 10/2013 | Kim | H04W 72/02 |
| | | | 370/329 |
| 2014/0071954 A1* | 3/2014 | Au | H04W 72/0446 |
| | | | 370/336 |
| 2014/0293900 A1* | 10/2014 | Takeda | H04L 1/0003 |
| | | | 370/329 |
| 2014/0307680 A1* | 10/2014 | Zhang | H04W 72/04 |
| | | | 370/329 |
| 2014/0341180 A1* | 11/2014 | Liu | H04L 5/0051 |
| | | | 370/330 |
| 2015/0289208 A1* | 10/2015 | Liu | H04L 1/1887 |
| | | | 370/252 |
| 2015/0289292 A1* | 10/2015 | Sun | H04W 74/0833 |
| | | | 370/329 |
| 2015/0341958 A1* | 11/2015 | Guo | H04W 72/042 |
| | | | 370/329 |
| 2015/0365218 A1* | 12/2015 | Yang | H04L 5/0044 |
| | | | 370/329 |
| 2016/0087774 A1* | 3/2016 | Guo | H04L 5/0051 |
| | | | 370/329 |
| 2016/0095104 A1* | 3/2016 | Chen | H04L 5/0048 |
| | | | 370/329 |
| 2016/0345311 A1* | 11/2016 | Chen | H04L 5/00 |
| 2016/0360529 A1* | 12/2016 | Lee | H04L 5/0048 |
| 2017/0013479 A1* | 1/2017 | Sun | H04W 24/02 |
| 2017/0013618 A1* | 1/2017 | Shin | H04W 72/0446 |
| 2017/0111923 A1* | 4/2017 | Nogami | H04W 72/1263 |
| 2017/0118743 A1* | 4/2017 | Kim | H04L 5/14 |
| 2017/0150499 A1* | 5/2017 | Kim | H04L 5/14 |
| 2017/0164363 A1* | 6/2017 | Zhang | H04L 1/00 |
| 2017/0290008 A1* | 10/2017 | Tooher | H04L 1/0007 |
| 2018/0041325 A1* | 2/2018 | Lee | H04L 1/00 |
| 2018/0042013 A1* | 2/2018 | Byun | H04J 11/00 |
| 2018/0049165 A1* | 2/2018 | Byun | H04B 7/26 |
| 2018/0098337 A1* | 4/2018 | Lee | H04W 72/042 |
| 2018/0110062 A1* | 4/2018 | Byun | H04B 7/26 |
| 2018/0115984 A1* | 4/2018 | Sahlin | H04W 72/1268 |
| 2018/0131430 A1* | 5/2018 | Gao | H04L 5/00 |
| 2018/0131473 A1* | 5/2018 | Moon | H04L 1/18 |
| 2018/0145857 A1* | 5/2018 | Kim | H04L 27/261 |
| 2018/0192434 A1* | 7/2018 | Lee | H04L 5/00 |
| 2018/0205534 A1* | 7/2018 | Yi | H04L 5/1469 |
| 2018/0206232 A1* | 7/2018 | Takeda | H04W 28/04 |
| 2018/0206266 A1* | 7/2018 | Byun | H04L 5/0053 |
| 2018/0212732 A1* | 7/2018 | You | H04L 5/0051 |
| 2018/0213530 A1* | 7/2018 | Mochizuki | H04W 72/12 |
| 2018/0234998 A1* | 8/2018 | You | H04W 72/042 |
| 2018/0255543 A1* | 9/2018 | Takeda | H04B 1/713 |
| 2018/0262945 A1* | 9/2018 | Yi | H04W 28/10 |
| 2018/0270794 A1* | 9/2018 | Tiirola | H04W 72/04 |
| 2018/0288745 A1* | 10/2018 | Davydov | H04W 72/042 |
| 2018/0288808 A1* | 10/2018 | Liu | H04W 72/0446 |
| 2018/0294942 A1* | 10/2018 | Byun | H04L 5/14 |
| 2018/0302900 A1* | 10/2018 | Ibars Casas | H04L 5/0053 |
| 2018/0310280 A1* | 10/2018 | Byun | H04L 5/0053 |
| 2018/0310282 A1* | 10/2018 | Shi | H04W 72/042 |
| 2018/0316468 A1* | 11/2018 | Kishiyama | H04W 28/04 |
| 2018/0343047 A1* | 11/2018 | He | H04L 1/1812 |
| 2018/0359745 A1* | 12/2018 | Yeo | H04L 1/18 |
| 2019/0223204 A1* | 7/2019 | Kim | H04W 72/1273 |

FOREIGN PATENT DOCUMENTS

| | | |
|---|---|---|
| WO | 2016142132 A1 | 9/2016 |
| WO | 2016142136 A1 | 9/2016 |
| WO | 2017030484 A1 | 2/2017 |

OTHER PUBLICATIONS

Unknown, Author, "sPUSCH sTTI operation", 3GPP TSG-RAN WG1 #86 bis, R1-1610327, Lisbon, Portugal, Ericsson, Oct. 10-14, 2016, 1-5.

Unknown, Author, "Study of shorter TTI for latency reduction", 3GPP TSG-RAN WG2 #91bis, Tdoc R2-154740, Malmö, Sweden, Ericsson, Oct. 5-9, 2015, 1-8.

* cited by examiner

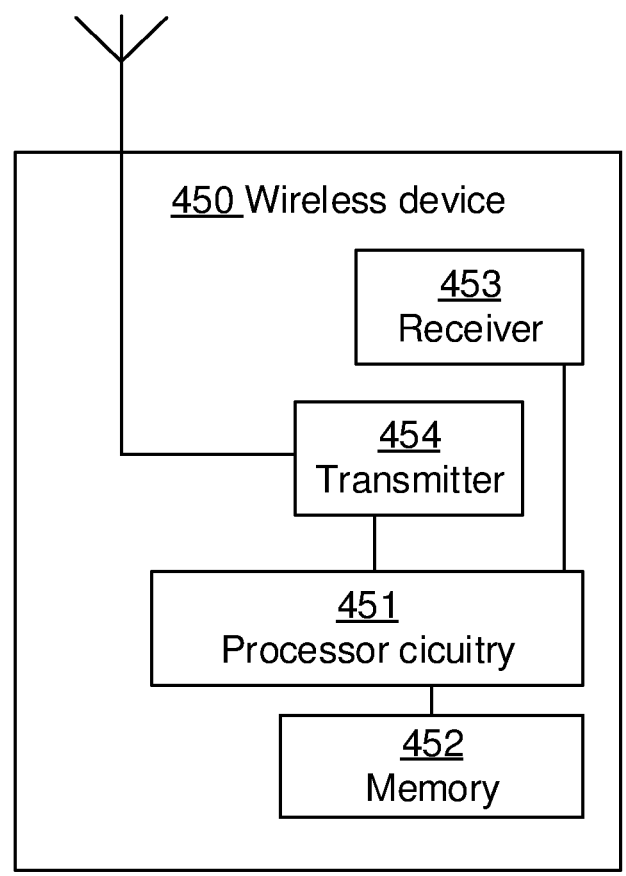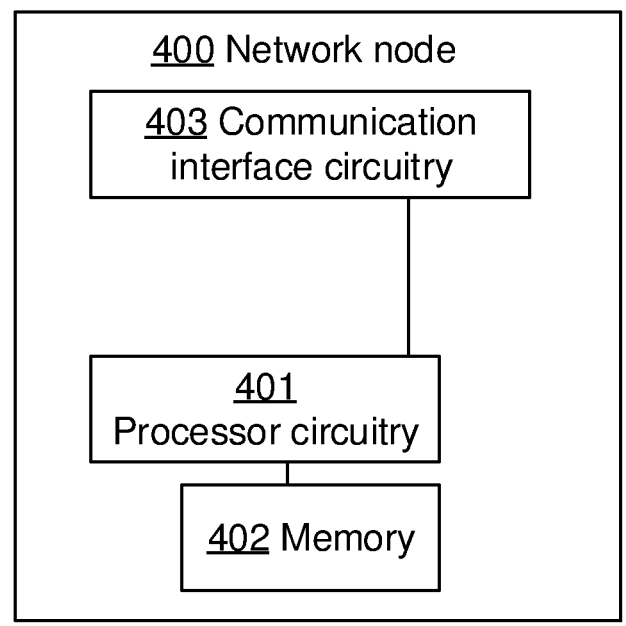
Fig. 5

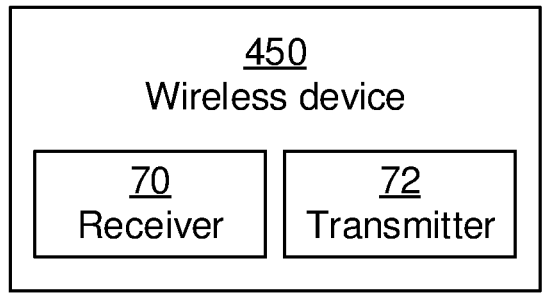
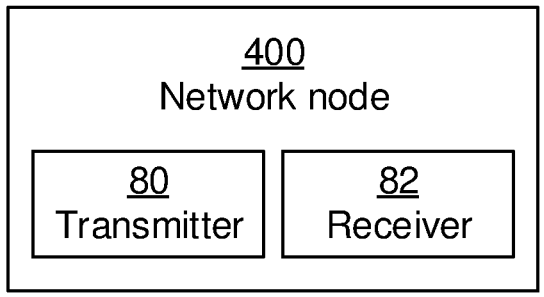
Fig. 6                    Fig. 7
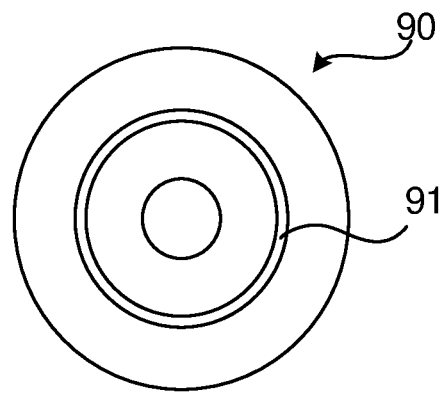
Fig. 8

METHODS AND APPARATUS FOR SCHEDULING IN UPLINK

TECHNICAL FIELD

The disclosure relates to scheduling in uplink of a wireless communication network, and more specifically to scheduling when a network node applies a short TTI (Transmission Time Interval) scheduling interval.

BACKGROUND

Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

One performance metric that guided the design of Long Term Evolution, LTE, was better latency than previous generations of Radio Access Technologies, RATs, defined by the Third Generation Partnership Project, 3GPP. LTE is also now recognized by the end-users to be a system that provides faster access to Internet and lower data latencies than previous generations of mobile radio technologies.

Packet data latency is important not only for the perceived responsiveness of the system; it is also a parameter that indirectly influences the throughput of the system. Hyper-Text Transport Protocol/Transport Control Protocol, HTTP/TCP, is the dominant application and transport layer protocol suite used on the Internet today. According to HTTP Archive, http://httparchive.org/trends.php, the typical size of HTTP-based transactions over the Internet range from a few 10s of Kbytes up to 1 Mbyte. In this size range, the TCP slow start period is a significant part of the total transport period of the packet stream. During TCP slow start, the "congestion window" used by TCP for defining the amount of traffic that can be outstanding, i.e., transmitted but not acknowledged, and packet latency limits how quickly the congestion window can be optimized. Hence, improved latency improves the average throughput for these types of TCP-based data transactions.

Radio resource efficiency in general is positively impacted by latency reductions. Lower packet data latency could increase the number of transmissions possible within a certain delay bound; hence higher Block Error Rate (BLER) targets could be used for the data transmissions freeing up radio resources potentially improving the capacity of the system.

Here, a "scheduling interval" is the smallest unit of time allocated when scheduling resources. In LTE, scheduling intervals are referred to as Transmission Time Intervals (TTI). One area to address when it comes to packet latency reductions is the reduction of transport time for data and control signaling, by addressing the length of a TTI. In LTE release 8, a TTI corresponds to one subframe (SF) of length 1 millisecond. One such 1 ms TTI is constructed by using 14 OFDM (Orthogonal Frequency Division Multiplexing) or SC-FDMA (Single Carrier Frequency Division Multiple Access) symbols in the case of normal cyclic prefix (CP) and 12 OFDM or SC-FDMA symbols in the case of extended CP. For LTE release 13, 3GPP is studying the use of transmissions in TTIs that are much shorter than the LTE release 8 TTI.

For this disclosure, it is assumed that the TTIs may be shortened compared to the release 8 TTI, by introducing a sub-subframe (SSF) concept, also denoted short TTI (sTTI). These shorter TTIs or sTTIs (also known as SSFs) can be decided to have any duration in time and comprise resources on a number of OFDM or SC-FDMA symbols within a 1 ms SF. As one example, the duration of the SSF may be 0.5 ms, i.e. seven OFDM or SC-FDMA symbols for the case of normal CP.

Uplink Scheduling Grants

The existing physical layer downlink control channels, Physical Downlink Control Channel (PDCCH) and enhanced PDCCH (ePDCCH), are used to carry Downlink Control Information (DCI) such as scheduling decisions and power control commands. Both PDCCH and ePDCCH are transmitted once every subframe (SF) of 1 ms. Throughout this disclosure, short PDCCH (sPDCCH) is used to denote downlink physical control channels transmitted once every SSF. Similarly, short Physical Downlink Shared Channel (sPDSCH) and short Physical Uplink Shared Channel (sPUSCH) are used to denote the downlink and uplink physical shared channels transmitted once every SSF, respectively.

There are currently a number of different Downlink Control Information (DCI) formats for uplink and downlink resource assignments, as specified in 3GPP TS 36.212 (Rel 10) V 12.6.0, section 5.3.3.1. Uplink scheduling grants use either DCI format 0 or DCI format 4. The latter DCI format 4 is added in Release 10 for supporting uplink spatial multiplexing.

In general, the DCI for an uplink (UL) scheduling grant contains:
  Resource allocation information
    Carrier indicator
    Resource allocation type
    Resource block allocation
  RS and data related information
    Modulation and coding scheme (MCS)
    New data indicator
    Cyclic shift of the uplink demodulation reference signals (DMRS)
    Precoding information
    Transmit power control
  Other information
    Sounding Reference Signal (SRS) request
    Channel State Information (CSI) request
    UL index (for Time Division Duplex (TDD))
    DCI format 0/1A indication (only in DCI format 0 and 1A)
    Padding
    Cyclic Redundancy Check (CRC) scrambled with Radio Network Temporary Identifier (RNTI) of the terminal Dynamic Switching Between SSF Lengths As mentioned, one way to reduce latency is to reduce the TTI. Instead of assigning resources for a time duration of 1 ms, i.e. for a subframe, resources may be assigned for a shorter duration than one subframe, i.e. for a SSF. The shorter duration or SSF may e.g. be defined in number of OFDM or SC-FDMA symbols. This implies a need for UE (User Equipment) specific control signaling that enables an indication of such shorter scheduling assignments.

Furthermore, there is also a need to be able to dynamically switch between different TTI or SSF durations, such as between the legacy 1 ms TTI and shorter TTIs, as well as between different shorter TTIs. This is needed in order to optimize the spectral efficiency, since shorter TTIs may incur higher overhead and/or worse demodulation performance.

Potential Problem with Existing Approaches

The existing way of operation, e.g. frame structure and control signaling, are designed for data allocations in a fixed length subframe of 1 ms, which may vary only in allocated bandwidth. Specifically, the current DCIs define resource allocations within the entire subframe.

SUMMARY

It is therefore an object to address some of the problems outlined above, and to provide solutions for allowing dynamic configuration of a sTTI duration for uplink transmissions.

According to aspects, this object and others are achieved by a method performed by a network node such as an eNodeB, and a method performed by a wireless device such as a User Equipment (UE). Furthermore, a network node and a wireless device adapted to perform the methods are provided. According to further aspects, the objects are achieved by computer programs and computer program products.

According to a first aspect, it is presented a method performed by a network node of a wireless communication network for scheduling a wireless device in uplink. An uplink signal structure is configured to be used by the wireless device and the network node, wherein the uplink signal structure defines transmission subframes divided into symbol periods. The network node applies a short Transmission Time Interval, sTTI, scheduling interval, wherein each sTTI is shorter in time than a subframe and each sTTI comprises at least one symbol period. The method comprises: transmitting a control information message to the wireless device for an sTTI scheduling interval, the control information message comprising uplink scheduling information assigned to the wireless device, the uplink scheduling information indicating a position and a length for at least one of a reference signal and data in the uplink sTTI.

According to a second aspect, it is presented a network node configured for operation in a wireless communication network, and configured to use an uplink signal structure defining transmission subframes divided into symbol periods. The network node is configured to schedule a wireless device in uplink and to apply a short Transmission Time Interval, sTTI, scheduling interval. Each sTTI is shorter in time than a subframe and each sTTI comprises at least one symbol period. The network node comprises a processor; and a memory storing instructions that, when executed by the processor, cause the network node to: transmit a control information message to the wireless device for an sTTI scheduling interval, the control information message comprising uplink scheduling information assigned to the wireless device, the uplink scheduling information indicating a position and a length for at least one of a reference signal and data in the uplink sTTI.

According to a third aspect, it is presented a network node comprising: means for transmitting a control information message, by the network node of a wireless communication network for scheduling a wireless device in uplink. An uplink signal structure is configured to be used by the wireless device and the network node. The uplink signal structure defining transmission subframes is divided into symbol periods, wherein the network node applies a short Transmission Time Interval, sTTI, scheduling interval. Each sTTI is shorter in time than a subframe and each sTTI comprises at least one symbol period. The control information message is configured to be transmitted to the wireless device for an sTTI scheduling interval. The control information message comprises uplink scheduling information assigned to the wireless device, the uplink scheduling information indicating a position and a length for at least one of a reference signal and data in the uplink sTTI.

According to a fourth aspect, it is presented a computer program for operation by a network node in a wireless communication network. The network node and wireless devices are configured to use an uplink signal structure defining transmission subframes divided into symbol periods, and configured to schedule a wireless device in uplink and to apply a short Transmission Time Interval, sTTI, scheduling interval. Each sTTI is shorter in time than a subframe and each sTTI comprises at least one symbol period. The computer program comprises computer program code which, when run on the network node causes the network node to: transmit a control information message to the wireless device for an sTTI scheduling interval, the control information message comprising uplink scheduling information assigned to the wireless device, the uplink scheduling information indicating a position and a length for at least one of a reference signal and data in the uplink sTTI.

According to a fifth aspect, it is presented a computer program product comprising a computer program according to the fourth aspect and a computer readable means on which the computer program is stored.

According to a sixth aspect, it is presented a method performed by a wireless device of a wireless communication network for transmitting signals in uplink. An uplink signal structure used by the wireless device defines transmission subframes divided into symbol periods. The wireless device is scheduled in uplink at short Transmission Time Interval, sTTI, scheduling intervals. Each sTTI is shorter in time than a subframe and each sTTI comprises at least one symbol period. The method comprises: receiving a control information message from a network node of the wireless communication network for an sTTI interval, the control information message comprising uplink scheduling information assigned to the wireless device, the uplink scheduling information indicating a position and a length for at least one of a reference signal and data in the uplink sTTI; and transmitting at least one of a reference signal and data in the uplink sTTI according to the received control information message.

According to a seventh aspect, it is presented a wireless device configured for operation in a wireless communication network. The wireless device is configured to use an uplink signal structure defining transmission subframes divided into symbol periods, and configured to be scheduled in uplink at short Transmission Time Interval, sTTI, scheduling intervals. Each sTTI is shorter in time than a subframe and each sTTI comprising at least one symbol period. The wireless device comprises a processor; and a memory storing instructions that, when executed by the processor, cause the wireless device to: receive a control information message from a network node of the wireless communication network for an sTTI interval, the control information message comprising uplink scheduling information assigned to the wireless device, the uplink scheduling information indicating a position and a length for at least one of a reference signal and data in the uplink sTTI; and transmit at least one of a reference signal and data in the uplink sTTI according to the received control information message.

According to an eighth aspect, it is presented a wireless device comprising: means for receiving a control information message from a network node of a wireless communication network of a wireless communication network for transmitting signals in uplink. An uplink signal structure used by the wireless device defines transmission subframes divided into symbol periods, wherein the wireless device is scheduled in uplink at short Transmission Time Interval, sTTI, scheduling intervals. Each sTTI is shorter in time than a subframe and each sTTI comprises at least one symbol period. The control information message is for an sTTI interval, and comprises uplink scheduling information assigned to the wireless device. The uplink scheduling information indicates a position and a length for at least one of a reference signal and data in the uplink sTTI. The wireless device also comprises means for transmitting at least one of a reference signal and data in the uplink sTTI according to the received control information message.

According to a ninth aspect, it is presented a computer program for operation by a wireless device of a wireless communication network for transmitting signals in uplink. An uplink signal structure used by the wireless device defines transmission subframes divided symbol periods. The wireless device is scheduled in uplink at short Transmission Time Interval, sTTI, scheduling intervals. Each sTTI is shorter in time than a subframe and each sTTI comprises at least one symbol period. The computer program comprises computer program code which, when run on the wireless device causes the wireless device to: receive a control information message from a network node of the wireless communication network for an sTTI interval, the control information message comprising uplink scheduling information assigned to the wireless device, the uplink scheduling information indicating a position and a length for at least one of a reference signal and data in the uplink sTTI; and transmit at least one of a reference signal and data in the uplink sTTI according to the received control information message.

According to a tenth aspect, it is presented a computer program product comprising a computer program according to the ninth aspect and a computer readable means on which the computer program is stored.

There are a number of effects as a result of the various embodiments presented herein:

Flexible and fast configuration of SSFs.

Possibility to schedule and transmit reference signals such as DMRS without user data, and user data without reference signals.

Low control signaling overhead by having a slow common grant, i.e. a frequency allocation grant, and a combined reference signal and data fast grant.

Fast grants distributed over several downlink symbols, to avoid the case where one symbol is highly loaded with control information.

Low complexity for handling corner cases by using a combined reference signal and data grant.

It is to be noted that the terms sTTI and SSF refer to the same concept and are equivalent. Hence, whenever the term SSF is used, this can be exchanged with sTTI, and vice versa.

Other objects, advantages and features of embodiments will be explained in the following detailed description when considered in conjunction with the accompanying drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 5 is a block diagram schematically illustrating a network node and a wireless device according to various embodiments.

FIG. 6 is a schematic diagram showing functional modules of the wireless device of FIG. 5 according to one embodiment.

FIG. 7 is a schematic diagram showing functional modules of the network node of FIG. 5 according to one embodiment.

FIG. 8 shows one example of a computer program product comprising computer readable means.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Figure 1:
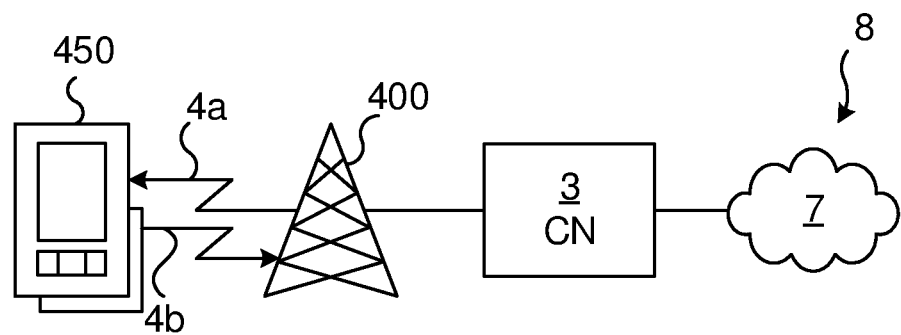
FIG. 1 is a schematic diagram illustrating an environment in which embodiments presented herein can be applied.

FIG. 1 is a schematic diagram illustrating an environment in which embodiments presented herein can be applied.

Embodiments are described in a non-limiting general context in relation to an example scenario in a communication network 8 being implemented using LTE, where an eNodeB schedules a UE in uplink by sending uplink grants in DCI. However, it should be noted that the embodiments may be applied to any network technology with similar procedures for scheduling in uplink. The DCI may be any type of control information, and the DMRS can be any type of reference signal. Furthermore, in the example scenarios described herein, the eNodeB and UE use a signal structure that defines transmission subframes divided into OFDM or SC-FDMA symbols. The wireless device 450 is scheduled in uplink in sub-subframe scheduling intervals, where an uplink sub-subframe comprises one or more SC-FDMA symbols. However, the embodiments may be applied to symbols with other symbol periods.

In some embodiments, a more general term "network node" 400 is used and it can correspond to any type of radio network node or any network node, which communicates with a UE and/or with another network node. Examples of network nodes are NodeB, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, nodes in distributed antenna system (DAS), and a core network node.

The radio network node 400 is also connected to the core network 3 for connectivity to central functions and a wide area network 7, such as the Internet.

In some embodiments the non-limiting term UE 450 is used and it refers to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles etc.

Over the wireless interface between the network node 400 and the wireless device 450, downlink (DL) communication 4a occurs from the radio network node 1 to the wireless device 2 and uplink (UL) communication 4b occurs from the wireless device 2 to the radio network node 1. The quality of the wireless radio interface to each wireless device 2 can vary over time and depending on the position of the wireless device 2, due to effects such as fading, multipath propagation, interference, etc.

One way to support SSF configuration is to define a new DCI format for SSF control using PDCCH. The new DCI format may be defined to support SSF configuration by introducing a time domain split field. However, if such a new DCI format is designed based on the use of PDCCH, SSF scheduling decisions can only be made per subframe as PDCCH is transmitted only once every subframe.

In another suggested solution, the DCI for an uplink grant is divided into two parts. One part is referred to as a slow grant or slow DCI, and the other part as a fast grant or fast DCI. The slow grant contains frequency resource allocation information. This slow grant is transmitted on a subframe basis in downlink. The slow grant is common for a group of wireless devices or UEs 450. The fast grant is device or UE specific, and it is transmitted on symbol basis in downlink. The fast grant may thus vary between different SSFs. Dynamic configuration of the SSF duration for an uplink transmission is performed based on the information conveyed in the fast grant. The fast grant or DCI may be conveyed to the wireless terminal UE 450 using an sPDCCH transmission(s). The wireless terminal UE 450 may monitor different sPDCCH candidate resources and attempt to decode an sPDCCH transmission intended for itself. If successful, the fast grant or DCI from the sPDCCH (together with the slow grant or DCI) may be used to determine an sPDSCH DL assignment or sPUSCH UL grant for the UE. In uplink transmissions, one or more SC-FDMA symbols with reference signals transmitted for each TTI leads to an increased overhead and a corresponding decrease in data rates, when the length of the TTI is reduced.

In another solution, sPDSCH SSFs do not necessarily contain DMRS if recent DMRS transmissions to the same UE have occurred. In this solution, the presence of DMRS in a downlink SSF may thus be signaled in the sPDCCH. Alternatively, the UE tries to blindly decode the transmission under the two assumptions DMRS present or DMRS not present. This solution focuses on reducing reference signals in downlink transmissions where the eNodeB both schedules the downlink transmission and actually transmits the downlink transmission. For uplink transmissions, the eNodeB schedules the transmissions while the UE transmits them.

Therefore, according to another solution, flexible DMRS for SSF in uplink is enabled by introducing separate reference signal grants and data grants for each sPUSCH. This method allows for flexible and fast reconfiguration of SSFs, and it enables UEs to transmit DMRS without transmitting user data. However, separating reference signal and data grants increases the control signaling overhead. Moreover, it increases the complexity for handling of corner cases, where different types of grants are not correctly detected by the user.

In embodiments presented herein, increased control signaling overhead and complexity is addressed by using a fast uplink grant or fast DCI, in which positions and lengths of both RS and data symbols, as well as the length of the SSF are indicated. Such a fast uplink grant design enables flexible configuration of sPUSCHs transmitted in SSF. Furthermore, it enables scheduling of DMRS transmission without data transmission in a scheduling interval, as well as scheduling of data transmission without DMRS transmission.

Proposed Fast Uplink Grant

The suggested fast uplink grant or fast DCI is transmitted on symbol basis in downlink and it is user-specific, i.e. specific for each wireless device 450. This fast uplink grant may comprise information related to both reference signal and data configuration for a sPUSCH. The fast uplink grant enables flexible configuration of a SSF, by indicating the positions and lengths of both reference signals and data symbols, as well as the length of the SSF.

Figure 2:
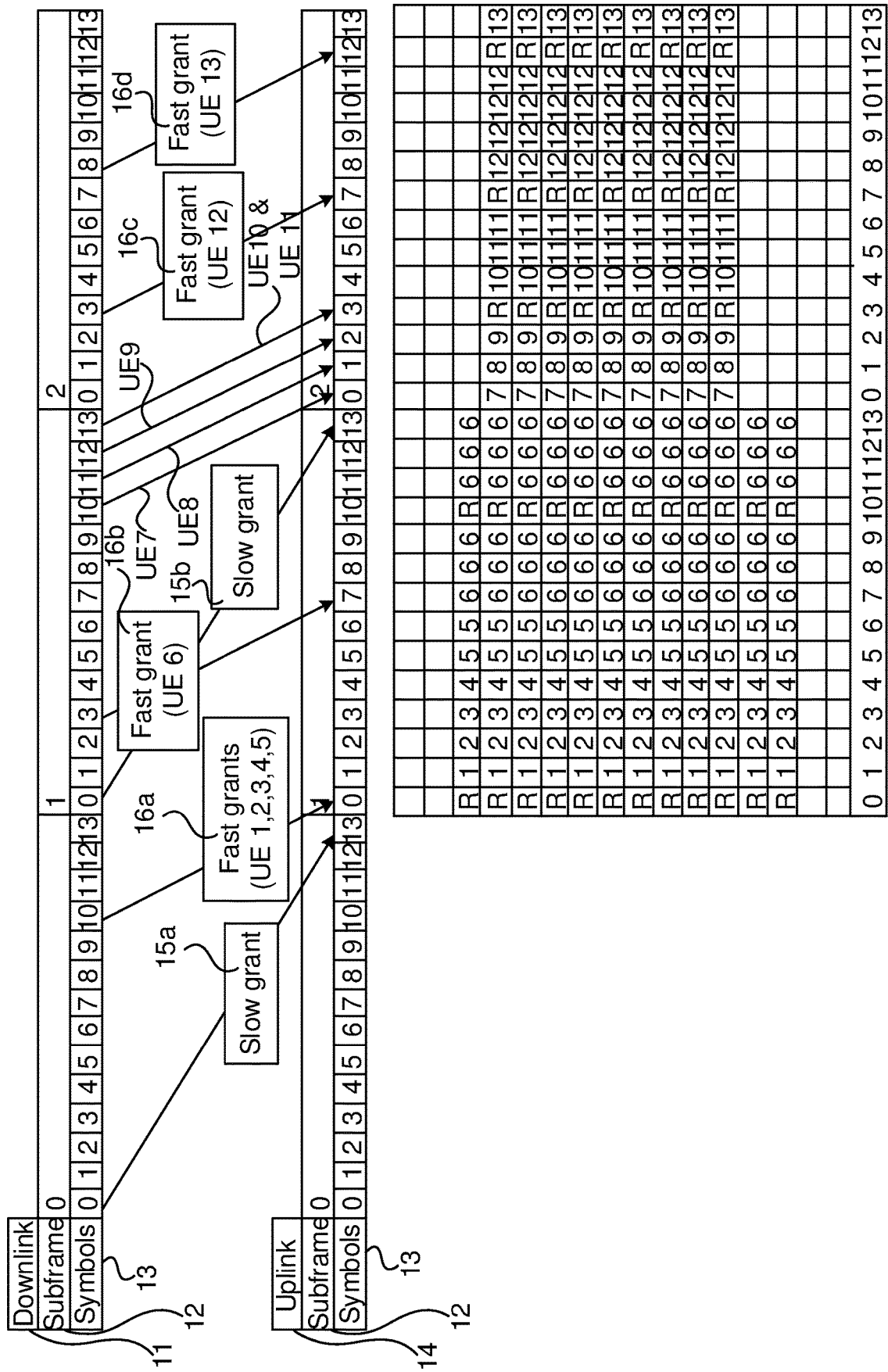
FIG. 2 is a schematic illustration of the use of fast uplink grants for different sPUSCHs according to various embodiments.

FIG. 2 illustrates schematically the use of proposed fast uplink grants 16a-c for different sPUSCHs with different SSF lengths, considering normal cyclic prefix, according to one example embodiment. Hereinafter, the fast uplink grant also referred to as the fast DCI above, will be referred to as a fast grant for simplification. The upper section of FIG. 2 shows downlink 11 and the lower section shows uplink 14. Time flows from left to right in FIG. 2 and is synchronised between uplink 14 and downlink 11. Hence there are subframes 12, where each subframe comprises fourteen symbol periods 13.

For each subframe, there is a slow grant 15a-b, as described above. Additionally, there are fast grants 16a-d for one or more UEs, as shown.

In the lower section of FIG. 2 illustrating the uplink, the lower table shown indicates the assignment of UEs to uplink radio resources, where each cell represents the transmission of one symbol. The character 'R' indicates the transmission of a reference signal.

In one embodiment, the fast grant is valid a fixed number of symbols after the transmission of the fast grant. Another way to formulate it is that the scheduling information in the fast grant is valid for a sub-subframe starting a defined number of symbols after the transmission of the control information message. This defined number of symbols may thus be pre-defined or preconfigured in the network and in the UE. In the example embodiment shown in FIG. 2, it is assumed that the fast grant is valid 4 symbols after the transmission. Thus, the fast grants 16a for UEs 1, 2, 3, 4, and 5 are transmitted at symbol 10 of SF 0, and these grants are valid at symbol 0 of SF 1, i.e. four symbols after the transmission of the fast grant. Similarly, the fast grant of UE 6 is transmitted at symbol 3 of SF 1, and it is valid at symbol 7 of SF 1. The fast grant for UE 7 is transmitted at symbol 10 of SF 1 and it is valid at symbol 0 of SF2. The fast grant for UE 8 is transmitted at symbol 11 of SF 1 and it is valid at symbol 1 of SF2. The fast grant for UE 9 is transmitted at symbol 12 of SF 1 and it is valid at symbol 2 of SF2. The fast grants of UEs 10 and 11 are transmitted at symbol 13 of SF 1, and these grants are valid at symbol 3 of SF 2.

In another embodiment, a few bits are added in the fast grant to indicate when it is valid.

Key Parameters for SSF Configuration

In the following, different example embodiments 1 to 6 of the SSF configuration are described. The first symbol of a certain SSF is defined as the symbol when the fast grant is valid.

Example Embodiment 1

In a first example embodiment, the SSF configuration is indicated by the following three parameters:

DMRS position (rs_position_id): This parameter specifies the position of DMRS within a certain uplink SSF. The values of rs_position_id may e.g. include {1, 2, 3, 4, 5, 6, 7}, where rs_position_id=n indicates that DMRS is transmitted at the n-th symbol of this SSF. If more than one DMRS symbol per SSF needs to be specified, further bits may be added to the parameter according to one embodiment.

Start position of data symbols (d_start_idx): This parameter indicates the starting position of the data symbols. The values of d_start_idx may e.g. include {1, 2, 3, 4, 5, 6, 7}, where d_start_idx=n indicates that data transmission is started from the n-th symbol of this SSF;

Data length (d_length): This parameter indicates the length of the data part of the SSF. More specifically, the value of d_length denotes the number of symbols in time domain allocated for this uplink data transmission. The values of d_length may include {0, 1, 2, 3, 4, 5, 6, 13}.

Table 1 gives the corresponding values of the three parameters for the different UEs shown in FIG. 2.

TABLE 1

Values for example embodiment 1 for SSFs illustrated in FIG. 2

|      | rs_position_id | d_start_idx | d_length |
|------|----------------|-------------|----------|
| UE1  | 1              | 2           | 1        |
| UE2  | 1              | 3           | 1        |
| UE3  | 1              | 4           | 1        |
| UE4  | 1              | 5           | 1        |
| UE5  | 1              | 6           | 2        |
| UE6  | 4              | 1           | 6        |
| UE7  | 4              | 1           | 1        |
| UE8  | 3              | 1           | 1        |
| UE9  | 2              | 1           | 1        |
| UE10 | 1              | 2           | 1        |
| UE11 | 1              | 3           | 2        |
| UE12 | 1              | 2           | 4        |
| UE13 | 1              | 1           | 1        |

In one embodiment, d_length=0 is used to specify that only DMRS are scheduled for this SSF. Alternatively, a predefined value of d_length other than zero may be used for this purpose. In another embodiment, d_start_idx=0 is used to specify that only DMRSs are scheduled for this SSF. Alternatively, a predefined value of d_start_idx other than zero may be used for this purpose. In yet another embodiment, rs_position_id=0 is used to specify that no reference signal is transmitted in this SSF. Alternatively, a predefined value of rs_position_id other than zero may be used for this purpose. This can be useful if a reference signal is already transmitted in a previous SSF and the channel variations are small such that a channel estimate from the previous SSF can be used for the current SSF. In yet another embodiment, two or more values of rs_position_id are given, such that more than one DMRS symbol per SSF can be specified.

Example Embodiment 2

In a second example embodiment, the SSF configuration is indicated by three parameters, i.e., DMRS position (rs_position_id), Data length (d_length), and Cyclic Shift index for DMRS. The first two parameters are the same as specified in Example 1. The start position of data symbols (d_start_idx) in the SSF is, however, indicated by the DMRS cyclic shift index in this example embodiment. Table 2 gives an example of mapping cyclic shift index to start position of data symbols. Here, d_start_idx=n implies that data transmission is started from the n:th symbol of this SSF.

TABLE 2

Mapping of cyclic shift index to start position of data symbols in a SSF

| Cyclic shift index | d_start_idx |
|--------------------|-------------|
| 0                  | 1           |
| 1                  | 2           |
| 2                  | 3           |
| 3                  | 4           |
| 4                  | 5           |
| 5                  | 6           |
| 6                  | 7           |
| 7                  | 8           |

In one embodiment, d_length=0 is used to specify that only DMRS are scheduled for this SSF. Alternatively, a predefined value of d_length other than zero may be used for this purpose. In another embodiment, rs_position_id=0 is used to specify that no reference signal is transmitted in this SSF. Alternatively, a predefined value of rs_position_id other than zero may be used for this purpose. In yet another embodiment, two or more values of rs_position_id are given, such that more than one DMRS symbol per SSF can be specified.

Example Embodiment 3

In a third example embodiment, the SSF configuration is indicated by the following three parameters:

Time offset (time_offset>0): The time offset in terms of number of symbols between the first symbol of the SSF and the target symbol position (i.e., the start position of data symbols or the position of DMRS).

Shift flag (shift_flag): This parameter indicates whether time offset is applied to the data symbols or to DMRS. For example, if shift_flag=0, then the time offset is applied to data symbols, and DMRS is placed at the first symbol of the SSF, and if shift_flag=1, the time_offset applies to DMRS, and data transmission is started from the first symbol of this SSF. However, the shift flag could also be used in the opposite way, i.e. shift_flag=0 indicating that the time offset is applied to DMRS instead.

Data length (d_length): as specified in Example embodiment 1.

TABLE 3

Values for example embodiment 3 for SSFs illustrated in FIG. 2

|  | time_offset | shift_flag | d_length |
|---|---|---|---|
| UE1 | 1 | 1 | 1 |
| UE2 | 2 | 1 | 1 |
| UE3 | 3 | 1 | 1 |
| UE4 | 4 | 1 | 1 |
| UE5 | 5 | 1 | 2 |
| UE6 | 3 | 0 | 6 |
| UE7 | 3 | 0 | 1 |
| UE8 | 2 | 0 | 1 |
| UE9 | 1 | 0 | 1 |
| UE10 | 1 | 1 | 1 |
| UE11 | 2 | 1 | 2 |
| UE12 | 1 | 1 | 4 |
| UE13 | 1 | 1 | 1 |

Table 3 gives the corresponding values of time_offset, shift_flag, and d_length for the different UEs shown in FIG. 2. In one embodiment, d_length=0 is used to specify that only DMRS are scheduled for this SSF. In another embodiment, time_offset=0 and shift_flag=0 is used to specify that only DMRS are scheduled for this SSF. In yet another embodiment, time_offst=0 and shift_flag=1 is used to specify that no DMRS is transmitted in this SSF. In a further embodiment, two or more values of time_offset are given, such that more than one reference signal per TTI can be specified.

Example Embodiment 4

In a fourth example embodiment, the SSF configuration is indicated by the following two parameters, starting position (start_idx) and data length (d_length):

Starting position (start_idx): This parameter indicates the starting position of the data symbols and the starting position of the DMRS symbols within a certain uplink SSF. More specifically, whether a data symbol or a DMRS symbol is transmitted at the beginning of the SSF is determined by the sign of the value start_idx.

If start_idx<0, then
  Data starts at the first symbol of the SSF. The first symbol of the SSF is defined as the symbol where the fast grant is valid.
  DMRS are transmitted |start_idx| symbols after the first symbol of the SSF. Here, |start_idx| denotes the absolute value of start_idx.

If start_idx>0, then
  DMRS are transmitted at the first symbol of the SSF.
  Data starts at symbol start_idx of the SSF.

An example of a 3-bit mapping of start_idx is given in Table 4.

TABLE 4

An example of 3-bit mapping of the parameter, start_idx

| Starting position field | start_idx |
|---|---|
| 000 | −3 |
| 001 | −2 |
| 010 | −1 |
| 011 | 1 |
| 100 | 2 |
| 101 | 3 |
| 110 | 4 |
| 111 | 5 |

Data length (d_length): as specified in Example 1.

Table 5 gives the corresponding values of start_idx and d_length for the different UEs shown in FIG. 2.

TABLE 5

Values for example embodiment 4 for SSFs illustrated in FIG. 2

|  | Start_idx | d_length |
|---|---|---|
| UE1 | 1 | 1 |
| UE2 | 2 | 1 |
| UE3 | 3 | 1 |
| UE4 | 4 | 1 |
| UE5 | 5 | 2 |
| UE6 | −3 | 6 |
| UE7 | −3 | 1 |
| UE8 | −2 | 1 |
| UE9 | −1 | 1 |
| UE10 | 1 | 1 |
| UE11 | 2 | 2 |
| UE12 | 1 | 4 |
| UE13 | 1 | 1 |

In one embodiment, two or more values of start_idx are given, such that more than one reference signal per TTI can be specified. In yet another embodiment, one value of start_idx is used to specify that no reference signal is transmitted in this TTI. This can be useful if a reference signal is already transmitted in a previous TTI and the channel variations are small such that a channel estimate from the previous TTI can be used for the current TTI. In yet another embodiment, d_length=0 is used to specify that only DMRS are scheduled for this SSF. In a further embodiment, the parameter d_length can be replaced by SSF_length, which specifies the length of the SSF. This embodiment is possible to combine with all of the described example embodiments herein.

Example Embodiment 5

In a fifth embodiment, the SSF configuration is indicated by one parameter (SSF_config_idx) to support a subset of SSF configurations with a small number of control information bits. Table 6 gives an example of mapping a value of SSF_config_idx (3 control information bits) to a SSF configuration.

TABLE 6

The mapping table for obtaining a SSF configuration (example embodiment 5)

| SSF_config_idx | SSF configuration |
|---|---|
| 0 | 1 data symbol, no DMRS |
| 1 | 1 DMRS symbol, no data |
| 2 | 1 DMRS symbol followed by 1 data symbol |
| 3 | 2 data symbols, no DMRS |
| 4 | 3 data symbols, no DMRS |
| 5 | 4 data symbols, no DMRS |
| 6 | 1 DMRS symbol followed by 4 data symbols |
| 7 | 3 data symbols followed by 1 DMRS symbol, and then 3 data symbols |

According to Table 6, the SSF configurations for UE1, 6, 10, and 12-13 in FIG. 2 can be supported with the use of SSF_config_idx 2, 7, 2, 6, and 2, respectively. The configurations for UEs 2-5 and 7-9 can be handled by sending two grants, with e.g. SSF_config_idx 1 and 0, respectively, for UE 2. Also, more bits can be added to the SSF_config_idx filed if more cases need to be supported.

Example Embodiment 6

In another embodiment a direct bitmap is used to indicate both data symbols and DMRS symbols. That is, the field or bitmap directly tells the number of symbols the grant relates to as well as which symbols that are allocated by reference signals and/or data. The following sub-embodiments are possible:

Example Embodiment 6a)

The assignment start is fixed in relation to where the DCI is sent as described above, and the number of bits tells the total number of symbols assigned. In one example the value 1 is for data symbols and 0 is for DMRS. Table 7 shows an example of assigning SSF of a length of three symbols. Typically, there may be one DMRS allocation and one or more data allocations. However, depending on system requirements, the embodiment enables scheduling more than one DMRS if needed e.g. for reliability purposes. It can be noted that special cases may have other predefined fixed allocations and the table gives one example for SSF_config_idx=000.

TABLE 7

The mapping table for obtaining a SSF configuration (emb. 6a)

| SSF_config_idx | SSF configuration |
| --- | --- |
| 000 | one or more DMRS on predefined locations |
| 100 | one data, two DMRS symbols |
| 110 | two data symbols, one DMRS symbol |
| 101 | one data, one DMRS and one data symbol |
| 011 | one DMRS and two data symbols |
| 010 | one DMRS, one data, one DMRS |
| 001 | two DMRS, one data |
| 111 | 3 data symbols |

Example Embodiment 6b)

Example embodiment 6b) is a combination of Example embodiment 6a) and Example 5. There is SSF_config_index, which is a number or a bit stream corresponding to a bitmap. This is to enable indicating only subsets of bitmaps. Table 8 describes this option with an example of length three SSF indicated with 2 bits.

TABLE 8

The mapping table for obtaining a SSF configuration (emb. 6b)

| SSF_config_idx | bitmap | SSF configuration |
| --- | --- | --- |
| 00 | 110 | two data symbols one DMRS symbol |
| 10 | 101 | one data, one DMRS and one data symbol |
| 01 | 011 | one DMRS and two data symbols |
| 11 | 111 | 3 data symbols |

Example Embodiment 6c)

In Example embodiment 6c) the SSF allocation can vary and the number of bits in the bitmap indicates the longest possible allocation. The assignment starts when indicated by the bits in the bitmap, and predefined rules indicate where DMRS is sent. Bit value 1 in the bitmap indicates that data or DMRS is allocated, and bit value 0 indicates no allocation. The DMRS positions in each allocation are predefined. Examples for the fixed or predefined DMRS positions are: DMRS is always sent in first or in the n:th assigned symbol; DMRS has predefined fixed position(s) within legacy subframe and when there is bit value 1 corresponding to a symbols that is pre-allocated to DMRS, the UE transmits DMRS on that symbol. Table 9 illustrates this example embodiment using separate SSF_config_idx and bitmap, but a direct bitmap may be used as well. In the example of table 9, it is assumed that DMRS is always sent in first symbols.

TABLE 9

The mapping table for obtaining a SSF configuration (emb. 6c)

| SSF_config_idx | bitmap | SSF configuration |
| --- | --- | --- |
| 00 | 11110 | one DMRS symbol followed by three data symbols starting from first indicated symbol |
| 10 | 00111 | one DMRS symbol followed by two data symbols starting from third indicated symbol |
| 01 | 01100 | one DMRS and one data symbols starting from second indicated symbol |
| 11 | 10110 | one DMRS starting with first indicated symbol and two data symbols starting with third indicated symbol |

Example Implementations of Methods

Figure 3:
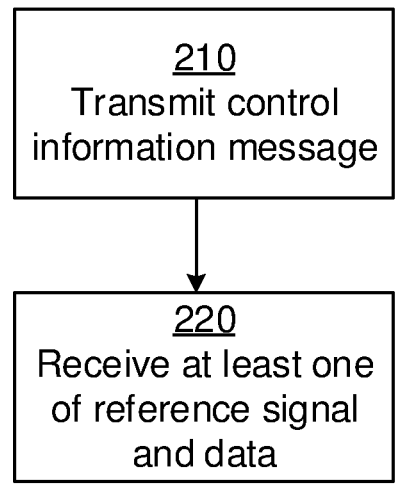
FIG. 3 is a flowchart illustrating the method in a network node according to various embodiments.

FIG. 3 is a flowchart illustrating one embodiment of a method performed by a network node 400 of a wireless communication network for scheduling a wireless device 450 in uplink. An uplink signal structure used by the wireless device and the network node defines transmission subframes divided into symbol periods. The network node applies a sub-subframe (i.e. sTTI) scheduling interval, where a sub-subframe comprises at least one symbol period. Each sub-subframe is shorter than a subframe.

In a transmit control information message step 210, the network node transmits a control information message to the wireless device for a sub-subframe scheduling interval. The control information message comprises uplink scheduling information assigned to the wireless device. The uplink scheduling information indicates a position and a length for at least one of a reference signal and data in the uplink sub-subframe, as disclosed in more detail in embodiments 1 to 6 above.

In one embodiment, the control information message comprises scheduling uplink information indicating a position and a length of respective reference signal and data in the uplink sub-subframe.

In one embodiment, the uplink scheduling information also indicates a length of the uplink sub-subframe.

The control information message can be specific for the wireless device. In other words, each wireless device can receive its own control information messages.

In one embodiment, the uplink scheduling information indicates a position and a length only for a reference signal, e.g. in accordance with embodiments 5 and 6 above.

In one embodiment, the uplink scheduling information indicates a position and a length for a plurality of reference signals, e.g. in accordance with embodiments 5 and 6 above.

In one embodiment, the uplink scheduling information indicates a position and a length only for data, e.g. in accordance with embodiments 5 and 6 above. In other words, no reference signals are then assigned in that particular uplink scheduling information.

In an optional receive at least one of reference signal and data step 220, the network node receives at least one of reference signal and data from the wireless device in the uplink sub-subframe, according to the transmitted control information message.

The at least one of reference signal and data can be received on a short Physical Uplink Shared Channel, sPUSCH, or a short Physical Uplink Control Channel, sPUCCH.

As explained above, the communication network can be configured as a Long Term Evolution, LTE, network, or as a LTE-Advanced network, according to 3GPP specifications. In such a case, the reference signal comprises a DeModulation Reference Symbol, DMRS.

Figure 4:
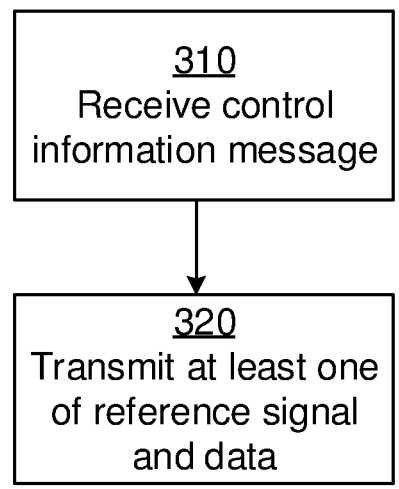
FIG. 4 is a flowchart illustrating the method in a wireless device according to various embodiments.

FIG. 4 is a flowchart illustrating one embodiment of the method performed by a wireless device 450 of a wireless communication network, for transmitting signals in uplink. An uplink signal structure used by the wireless device defines transmission subframes divided into symbol periods. The wireless device is scheduled in uplink at sub-subframe (i.e. sTTI) scheduling intervals. A sub-subframe comprises at least one symbol period. Each sub-subframe is shorter than a subframe.

In a receive control information message step 310, a control information message is received from a network node for a sub-subframe scheduling interval. The control information message comprises uplink scheduling information assigned to the wireless device. The uplink scheduling information indicates a position and a length for at least one of a reference signal and data in the uplink sub-subframe, as disclosed in more detail in embodiments 1 to 6 above.

In one embodiment, the uplink scheduling information indicates a position and a length of respective reference signal and data in the uplink sub-subframe.

In one embodiment, the uplink scheduling information also indicates a length of the uplink sub-subframe.

The control information message can be specific for the wireless device. In other words, each wireless device can receive its own control information messages.

In one embodiment, the uplink scheduling information indicates a position and a length only for a reference signal, e.g. in accordance with embodiments 5 and 6 above.

In one embodiment, the uplink scheduling information indicates a position and a length for a plurality of reference signals, e.g. in accordance with embodiments 5 and 6 above.

In one embodiment, the uplink scheduling information indicates a position and a length only for data, e.g. in accordance with embodiments 5 and 6 above. In other words, no reference signals are then assigned in that particular uplink scheduling information.

The method also comprises a transmit at least one of reference signal and data step 320, where the wireless device transmits at least one of reference signal and data in the uplink sub-subframe according to the received control information message.

The at least one of reference signal and data can be transmitted on a short Physical Uplink Shared Channel, PUSCH, or a short Physical Uplink Control Channel, PUCCH.

As explained above, the communication network can be configured as a Long Term Evolution, LTE, network, or as a LTE-Advanced network, according to 3GPP specifications. In such a case, the reference signal comprises a DeModulation Reference Symbol, DMRS.

Using embodiments of the methods of FIGS. 3 and 4, great flexibility of how to allocate data for sTTI is achieved. This flexibility allows the allocation of any data and/or reference signals in any suitable configuration. Moreover, the signalling is provided in a very efficient manner.

Example Implementations of Wireless Device and Network Node

FIG. 5 illustrates a block diagram of the network node 400 and the wireless device 450, in accordance with a particular embodiment. Here the wireless device 450 communicates with the network node 400.

The network node 400 comprises a communication interface circuitry 403 for communicating with the wireless device. If the network node is an eNodeB, the communication interface circuitry may comprise a transceiver circuitry which may be connected via an antenna port to a same or to different transmitting/receiving antennas. The network node also comprises control circuitry, which may comprise a processor circuitry 401 connected to a memory 402. The control circuitry is connected to the communication interface circuitry, which may e.g. provide receiver and transmitter and/or transceiver functionality. The network node 400 may be adapted to carry out any of the methods performed by the network node disclosed herein. The memory 402 may comprise instructions executable by said processor circuitry 401 whereby said network node 400 is operative to perform the methods described herein.

The wireless device 450 in FIG. 5 comprises a receiver circuitry 453 and a transmitter circuitry 454 for communicating with the network. The receiver and transmitter circuitries may be connected via one or more antenna ports to a same or to different transmitting/receiving antennas. The wireless device 450 also comprises control circuitry, which may comprise a processor circuitry 451 connected to a memory 452. The control circuitry is connected to the transmitter and receiver circuitry, which provide receiver and transmitter functionality. The wireless device 450 may be adapted to carry out any of the methods performed by the wireless device disclosed herein. The memory 452 may comprise instructions executable by said processor circuitry 451 whereby said wireless device 450 is operative to perform the methods described herein.

In an alternative way to describe the embodiment in FIG. 5, the network node 400 comprises a Central Processing Unit (CPU) which may be a single unit or a plurality of units. Furthermore, the network node 400 comprises at least one computer program product (CPP) in the form of a non-volatile memory, e.g. an EEPROM (Electrically Erasable Programmable Read-Only Memory), a flash memory or a disk drive. The CPP comprises a computer program, which comprises code means which when run on the network node 400 causes the CPU to perform steps of the procedure described earlier e.g. in conjunction with FIG. 3. In other words, when said code means are run on the CPU, they correspond to the processing circuitry 401 of FIG. 5.

Furthermore, the wireless device 450 may comprise a Central Processing Unit (CPU) which may be a single unit or a plurality of units, and at least one computer program product (CPP) in the form of a non-volatile memory, e.g. an EEPROM (Electrically Erasable Programmable Read-Only Memory), a flash memory or a disk drive. The CPP comprises a computer program, which comprises code means which when run on the wireless device 450 causes the CPU to perform steps of the procedure described earlier e.g. in conjunction with FIG. 4. In other words, when said code means are run on the CPU, they correspond to the processing circuitry 451 of FIG. 5.

FIG. 6 is a schematic diagram showing functional modules of the wireless device 450 of FIG. 5 according to one embodiment. The modules are implemented using software instructions such as a computer program executing in the wireless device 450. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIG. 4.

A receiver 70 corresponds to step 310. A transmitter 72 corresponds to step 320.

FIG. 7 is a schematic diagram showing functional modules of the network node 400 of FIG. 5 according to one embodiment. The modules are implemented using software instructions such as a computer program executing in the network node 400. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIG. 3.

A transmitter 80 corresponds to step 210. A receiver corresponds to step 220. FIG. 8 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the memory 402 of the network node 400 and/or the memory 452 of the wireless device 450 in FIG. 5. While the computer program 91 is here schematically shown as a track on the depicted optical disk, the computer program can be stored in any way which is suitable for the computer program product, such as a removable solid state memory, e.g. a Universal Serial Bus (USB) drive.

List of Example Embodiments

Here now follows a list of embodiments from another perspective, enumerated with roman numerals.

i. A method performed by a network node of a wireless communication network for scheduling a wireless device in uplink, wherein an uplink signal structure used by the wireless device and the network node defines transmission subframes divided into symbol periods, wherein the network node applies a sub-subframe scheduling interval, a sub-subframe comprising at least one symbol period, the method comprising:

transmitting a control information message to the wireless device for a sub-subframe scheduling interval, the control information message comprising uplink scheduling information indicating a length of an uplink sub-subframe, and a position and a length of respective reference signal and data in the uplink sub-subframe.

ii. The method of embodiment i, wherein the uplink scheduling information is valid for a sub-subframe starting a number of symbol periods after the transmission of the control information message.

iii. The method of embodiment ii, wherein the number of symbol periods is preconfigured or is indicated in the control information message.

iv. The method of any of embodiments i-iii, wherein said position and lengths are indicated with a symbol period granularity.

v. The method of any of embodiments i-iv, wherein the uplink scheduling information comprises:

a parameter indicating the position of at least one reference signal in the uplink sub-subframe, a parameter indicating a starting position of the data in the uplink sub-subframe, and a parameter indicating the length of the data in the uplink sub-subframe, or a parameter indicating the length of the sub-subframe.

vi. The method of embodiment v further comprising determining to schedule only reference signal in the uplink sub-subframe, and wherein the parameter indicating the starting position of the data in the uplink sub-subframe is set to a predefined value, e.g. value zero, to indicate the determined scheduling.

vii. The method of embodiment v further comprising determining not to schedule any reference signal in the uplink sub-subframe, and wherein the parameter indicating the position of the at least one reference signal is set to a predefined value, e.g. value zero, to indicate the determined scheduling.

viii. The method of embodiment v further comprising determining to schedule more than one reference signal in the uplink sub-subframe, and wherein the uplink scheduling information comprises at least one further parameter indicating a position of reference signals in the uplink sub-subframe, to indicate the determined scheduling.

ix. The method of any of embodiments v-viii, wherein the parameter specifying the starting position of the data in the uplink sub-subframe is a cyclic shift index of the reference signal, or an index of a symbol period.

x. The method of any of embodiments i-iv, wherein the uplink scheduling information comprises:

a parameter indicating a time offset in number of symbol periods between a first symbol period of the sub-subframe and at least one target symbol period position, wherein the at least one target symbol period position is the position of a reference signal in the uplink sub-subframe, or a starting position of the data in the uplink sub-subframe, a shift flag parameter indicating whether the time offset is applied to the position of the reference signal, or to the starting position of the data, and a parameter indicating the length of the data in the uplink sub-subframe, or a parameter indicating the length of the sub-subframe.

xi. The method of embodiment x, further comprising determining to schedule only reference signal in the uplink sub-subframe, and wherein the shift flag parameter is set to indicate that the time offset is applied to the starting position of the data, and the parameter indicating the time offset is set to a predefined value, e.g. value zero, to indicate the determined scheduling.

xii. The method of embodiment x, further comprising determining not to schedule any reference signal in the uplink sub-subframe, and wherein the shift flag parameter is set to indicate that the time offset is applied to the position of the reference signal, and the parameter indicating the time offset is set to a predefined value, e.g. value zero, to indicate the determined scheduling.

xiii. The method of embodiment x, further comprising determining to schedule more than one reference signal in the uplink sub-subframe, and wherein the uplink scheduling information comprises at least one further parameter indicating a time offset, to indicate the determined scheduling.

xiv. The method of any of embodiments i-iv, wherein the uplink scheduling information comprises:

a starting position parameter indicating a starting position of the data and a starting position of the reference signal, wherein the sign of the starting position parameter indicates whether it is the data or the reference symbol that starts at the first symbol period of the sub-subframe, and wherein the value of the starting position parameter indicates the index of the other starting position, and a parameter indicating the length of the data in the uplink sub-subframe, or a parameter indicating the length of the sub-subframe.

xv. The method of embodiment v, x, or xiv, further comprising determining to schedule only reference signal in the uplink sub-subframe, and wherein the parameter indicating the length of the data in the uplink sub-subframe, or the parameter indicating the length of the sub-subframe is set to a predefined value, e.g. value zero, to indicate the determined scheduling.

xvi. The method of embodiment xiv, further comprising determining not to schedule any reference signal in the uplink sub-subframe, and wherein the starting position parameter is set to a predetermined value to indicate the determined scheduling.

xvii. The method of embodiment xiv, further comprising determining to schedule more than one reference signal in the uplink sub-subframe, and wherein the uplink scheduling information comprises at least one further starting position parameter, to indicate the determined scheduling.

xviii. The method of any of embodiments i-iv, wherein the uplink scheduling information comprises:

at least one configuration index parameter which maps to one of a set of defined uplink sub-subframe configurations, each defined uplink sub-subframe configuration indicating at least one of the length of the uplink sub-subframe, the position of respective reference signal and data in the uplink sub-subframe, and the length of respective reference signal and data in the uplink sub-subframe.

xix. The method of embodiment xviii, wherein the configuration index parameter comprises a bitmap, wherein a bit in the bitmap corresponds to a position in the uplink sub-subframe, and a value of the bit indicates whether the corresponding position is used for reference signal or data.

xx. The method of any of embodiments i-xix, further comprising:

receiving at least one of reference signal and data from the wireless device in the uplink sub-subframe, according to the transmitted control information message.

xxi. The method of any of embodiments i-xx, wherein the sub-subframe is a transmission time interval.

xxii. The method of any of embodiments i-xxi, wherein the uplink scheduling information indicates a configuration of the sub-subframe.

xxiii. The method of any of embodiments i-xxii, wherein the at least one of reference signal and data is received on a short Physical Uplink Shared Channel (PUSCH) or a short Physical Uplink Control Channel (PUCCH).

xxiv. The method of any of embodiments i-xxiii, wherein the network node operates as a serving radio network node with respect to the wireless device, or otherwise provides a radio connection to the communication network for the wireless device.

xxv. The method of any of embodiments i-xxiv, wherein the communication network is configured as a Long Term Evolution (LTE) network, or as a LTE-Advanced network, according to Third Generation Partnership Project (3GPP) specifications, wherein the reference signal comprise a DeModulation Reference Symbol (DMRS).

xxvi. A network node configured for operation in a wireless communication network, and configured to use an uplink signal structure defining transmission subframes divided into symbol periods, and configured to schedule a wireless device in uplink and to apply a sub-subframe scheduling interval, a sub-subframe comprising at least one symbol period, the network node being further configured to perform the method according to any of embodiments i-xxv.

xxvii. The network node of embodiment xxvi, comprising a radio transceiver circuitry configured to transmit signals to the wireless device and receive signals from the wireless device, a processing circuitry operatively associated with the radio transceiver circuitry, and a memory operatively associated with the processing circuitry, wherein the memory comprises instructions executable by the processing circuitry whereby said network node is operative to perform the method according to any of embodiments i-xxv.

xxviii. A method performed by a wireless device of a wireless communication network, for transmitting signals in uplink, wherein an uplink signal structure used by the wireless device defines transmission subframes divided into symbol periods, wherein the wireless device is scheduled in uplink at sub-subframe scheduling intervals, a sub-subframe comprising at least one symbol period, the method comprising:

receiving a control information message from a network node for a sub-subframe scheduling interval, the control information message comprising uplink scheduling information indicating a length of an uplink sub-subframe, and a position and a length of respective reference signal and data in the uplink sub-subframe, and transmitting at least one of reference signal and data in the uplink sub-subframe according to the received control information message.

xxix. The method of embodiment xxviii, wherein the uplink scheduling information is valid for a sub-subframe starting a number of symbol periods after the reception of the control information message.

xxx. The method of embodiment xxix, wherein the number of symbol periods is preconfigured or is indicated in the control information message.

xxxi. The method of any of embodiments xxviii-xxx, wherein said position and lengths are indicated with a symbol period granularity.

xxxii. The method of any of embodiments xxviii-xxxi, wherein the uplink scheduling information comprises:

a parameter indicating the position of the reference signal in the uplink sub-subframe, a parameter indicating a starting position of the data in the uplink sub-subframe, and a parameter indicating the length of the data in the uplink sub-subframe, or a parameter indicating the length of the sub-subframe.

xxxiii. The method of embodiments xxxii, wherein the parameter specifying the starting position of the data in the uplink sub-subframe is a cyclic shift index of the reference signal, or an index of a symbol period.

xxxiv. The method of any of embodiments xxxviii-xxxi, wherein the uplink scheduling information comprises:

a parameter indicating a time offset in number of symbol periods between a first symbol period of the sub-subframe and a target symbol period position, wherein the target symbol period position is the position of the reference signal in the uplink sub-subframe, or a starting position of the data in the uplink sub-subframe, a shift flag parameter indicating whether the time offset is applied to the position of the reference signal, or to the starting position of the data, and a parameter indicating the length of the data in the uplink sub-subframe, or a parameter indicating the length of the sub-subframe.

xxxv. The method of any of embodiments xxxviii-xxxi, wherein the uplink scheduling information comprises:

a starting position parameter indicating a starting position of the data and a starting position of the reference signal, wherein the sign of the starting position parameter indicates whether it is the data or the reference symbol that starts at the first symbol period of the sub-subframe, and wherein the value of the starting position parameter indicates the index of the other starting position, and a parameter indicating the length of the data in the uplink sub-subframe, or a parameter indicating the length of the sub-subframe.

xxxvi. The method of any of embodiments xxxviii-xxxi, wherein the uplink scheduling information comprises:

at least one configuration index parameter which maps to one of a set of defined uplink sub-subframe configurations, each defined uplink sub-subframe configuration indicating at least one of the length of the uplink sub-subframe, the position of respective reference signal and data in the uplink sub-subframe, and the length of respective reference signal and data in the uplink sub-subframe.

xxxvii. The method of embodiment xxxvi, wherein the configuration index parameter comprises a bitmap, wherein a bit in the bitmap corresponds to a position in the uplink sub-subframe, and a value of the bit indicates whether the corresponding position is used for reference signal or data.

xxxviii. The method of any of embodiments xxxviii-xxxvii, wherein the sub-subframe is a transmission time interval.

xxxix. The method of any of embodiments xxxviii-xxxviii, wherein the uplink scheduling information indicates a configuration of the sub-subframe.

xl. The method of any of embodiments xxxviii-xxxix, wherein the at least one of reference signal and data is transmitted on a short Physical Uplink Shared Channel (PUSCH) or a short Physical Uplink Control Channel (PUCCH).

xli. The method of any of embodiments xxxviii-xl, wherein the network node operates as a serving radio network node with respect to the wireless device, or otherwise provides a radio connection to the communication network for the wireless device.

xlii. The method of any of embodiments xxxviii-xli, wherein the communication network is configured as a Long Term Evolution (LTE) network, or as a LTE-Advanced network, according to Third Generation Partnership Project (3GPP) specifications, wherein the reference signal comprise a DeModulation Reference Symbol (DMRS).

xliii. A wireless device configured for operation in a wireless communication network, configured to use an uplink signal structure defining transmission subframes divided into symbol periods, and configured to be scheduled in uplink at sub-subframe scheduling intervals, a sub-subframe comprising at least one symbol period, the wireless device being further configured to perform the method according to any of embodiments xxxviii-xlii.

xliv. The wireless device of embodiment xliii, comprising a radio transceiver circuitry configured to transmit signals to the network node and receive signals from the network node, a processing circuitry operatively associated with the transceiver circuitry, and a memory operatively associated with the processing circuitry, wherein the memory comprises instructions executable by the processing circuitry whereby said wireless device is operative to perform the method according to any of embodiments xxxviii-xlii.

xlv. A computer program comprising computer readable code which when run on a network node causes the network node to perform a method according to any of embodiments i-xxv.

xlvi. A computer program comprising computer readable code which when run on a wireless device causes the wireless device to perform a method according to any of embodiments xxxviii-xlii.

xlvii. A computer program product comprising a computer readable medium and a computer program according to any of embodiments xlv-xlvi, wherein the computer program is stored on the computer readable medium.

Abbreviations

BLER Block Error Rate
DCI Downlink Control Information
ePDCCH enhanced Physical Downlink Control Channel
LTE Long Term Evolution
MAC Medium Access Control
MCS Modulation and Coding Scheme
OFDM Orthogonal Frequency Division Multiple Access
PDCCH Physical Downlink Control Channel
PDSCH Physical Downlink Shared Channel
PRB Physical Resource Block
PUSCH Physical Uplink Shared Channel
RAT Radio Access Technology
RB Resource Block
RE Resource Element
RRC Radio Resource Control
SC-FDMA Single Carrier-Frequency Division Multiple Access
sPDCCH short Physical Downlink Control Channel
sPDSCH short Physical Downlink Shared Channel
sPUSCH short Physical Uplink Shared Channel
SF SubFrame
SSF Sub-SubFrame
TTI Transmission Time Interval
sTTI short Transmission Time Interval The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a network node of a wireless communication network for scheduling a wireless device in uplink, wherein an uplink signal structure is configured to be used by the wireless device and the network node, the uplink signal structure defining transmission subframes divided into symbol periods, the method comprising:

transmitting an uplink grant message for the wireless device, granting uplink resources for an uplink transmission by the wireless device in a short scheduling interval that is shorter in number of symbol periods than the length of the transmission subframes, the uplink grant message including a field comprising a sequence of bits indicating: the length in number of symbol periods of the short scheduling interval; a position of a first symbol period within the short scheduling interval comprising a demodulation reference signal; and whether further symbol periods within the short scheduling interval comprise a demodulation reference signal.

2. The method according to claim 1, wherein the field comprising the sequence of bits additionally indicates a number of symbol periods and a position within the granted uplink resources for data.

3. The method according to claim 1, further comprising receiving the uplink transmission from the wireless device, on the granted uplink resources.

4. A network node configured for operation in a wireless communication network, and configured to use an uplink signal structure defining transmission subframes divided into symbol periods, the network node comprising:
a processor; and
a memory storing instructions that, when executed by the processor, cause the network node to:
transmit an uplink grant message for the wireless device, granting uplink resources for an uplink transmission by the wireless device in a short scheduling interval that is shorter in number of symbol periods than the length of the transmission subframes, the uplink grant message including a field comprising a sequence of bits indicating: the length in number of symbol periods of the short scheduling interval; a position of a first symbol period within the short scheduling interval comprising a demodulation reference signal; and
whether further symbol periods within the short scheduling interval comprise a demodulation reference signal.

5. The network node according to claim 4, wherein the sequence of bits additionally indicates a number of symbol periods and a position within the granted uplink resources for data.

6. The network node according to claim 4, further comprising instructions that, when executed by the processor, cause the network node to receive the uplink transmission from the wireless device, on the granted uplink resource.

7. A non-transitory computer readable medium storing a computer program for operation by a network node in a wireless communication network, the network node configured to use an uplink signal structure defining transmission subframes divided into symbol periods, the computer program comprising computer program code that, when run on a processor of the network node, causes the network node to:
transmit an uplink grant message for the wireless device, granting uplink resources for an uplink transmission by the wireless device in a short scheduling interval that is shorter in number of symbol periods than the length of the transmission subframes, the uplink grant message including a field comprising a sequence of bits indicating: the length in number of symbol periods of the short scheduling interval; a position of a first symbol period within the short scheduling interval comprising a demodulation reference signal; and whether further symbol periods within the short scheduling interval comprise a demodulation reference signal.

8. A method performed by a wireless device of a wireless communication network for transmitting signals in uplink, wherein an uplink signal structure used by the wireless device defines transmission subframes divided into symbol periods, the method comprising:
receiving an uplink grant message for the wireless device, granting uplink resources for an uplink transmission by the wireless device in a short scheduling interval that is shorter in number of symbol periods than the length of the transmission subframes, the uplink grant message including a field comprising a sequence of bits indicating: the length in number of symbol periods of the short scheduling interval; a position of a first symbol period within the short scheduling interval comprising a demodulation reference signal; and whether further symbol periods within the short scheduling interval comprise a demodulation reference signal; and
performing the uplink transmission on the granted uplink resources.

9. The method according to claim 8, wherein the uplink transmission comprises both the reference signal and data and wherein the sequence of bits additionally indicates a number of symbol periods and a position within the granted uplink resources for the data.

10. A wireless device configured for operation in a wireless communication network, and configured to use an uplink signal structure defining transmission subframes divided into symbol periods, the wireless device comprising:
a processor; and
a memory storing instructions that, when executed by the processor, cause the wireless device to:
receive an uplink grant message for the wireless device, granting uplink resources for an uplink transmission by the wireless device in a short scheduling interval that is shorter in number of symbol periods than the length of the transmission subframes, the uplink grant message includes a field comprising a sequence of bits indicating: the length in number of symbol periods of the short scheduling interval; a position of a first symbol period within the short scheduling interval comprising a demodulation reference signal; and
whether further symbol periods within the short scheduling interval comprise a demodulation reference signal; and
perform the uplink transmission on the granted uplink resources.

11. The wireless device according to claim 10, wherein the uplink transmission comprises the reference signal and data, and wherein the sequence of bits additionally indicates a number of symbol periods and a position within the granted uplink resources for the data.

12. A non-transitory computer readable medium storing a computer program for operation by a wireless device of a wireless communication network, the wireless device configured for transmitting signals in uplink, wherein an uplink signal structure used by the wireless device defines transmission subframes divided symbol periods, the computer program comprising computer program code that, when run on a processor of the wireless device, causes the wireless device to:
receive an uplink grant message for the wireless device, granting uplink resources for an uplink transmission by the wireless device in a short scheduling interval that is shorter in number of symbol periods than the length of the transmission subframes, the uplink grant message including a field comprising a sequence of bits indicating: the length in number of symbol periods of the short scheduling interval; a position of a first symbol period within the short scheduling interval comprising a demodulation reference signal; and whether further symbol periods within the short scheduling interval comprise a demodulation reference signal; and perform the uplink transmission on the granted uplink resources.

\* \* \* \* \*

UNITED STATES PATENT AND TRADEMARK OFFICE
CERTIFICATE OF CORRECTION

PATENT NO. : 10,757,724 B2
APPLICATION NO. : 15/559457
DATED : August 25, 2020
INVENTOR(S) : Sahlin et al.

Page 1 of 1

It is certified that error appears in the above-identified patent and that said Letters Patent is hereby corrected as shown below:

In the Specification

In Column 15, Line 12, delete "Symbol," and insert -- Signal, --, therefor.

In Column 15, Line 62, delete "Symbol," and insert -- Signal, --, therefor.

In Column 19, Line 67, delete "Symbol" and insert -- Signal --, therefor.

In Column 21, Line 56, delete "Symbol" and insert -- Signal --, therefor.

Signed and Sealed this
Fifth Day of January, 2021

Andrei Iancu
*Director of the United States Patent and Trademark Office*